Figure 1:
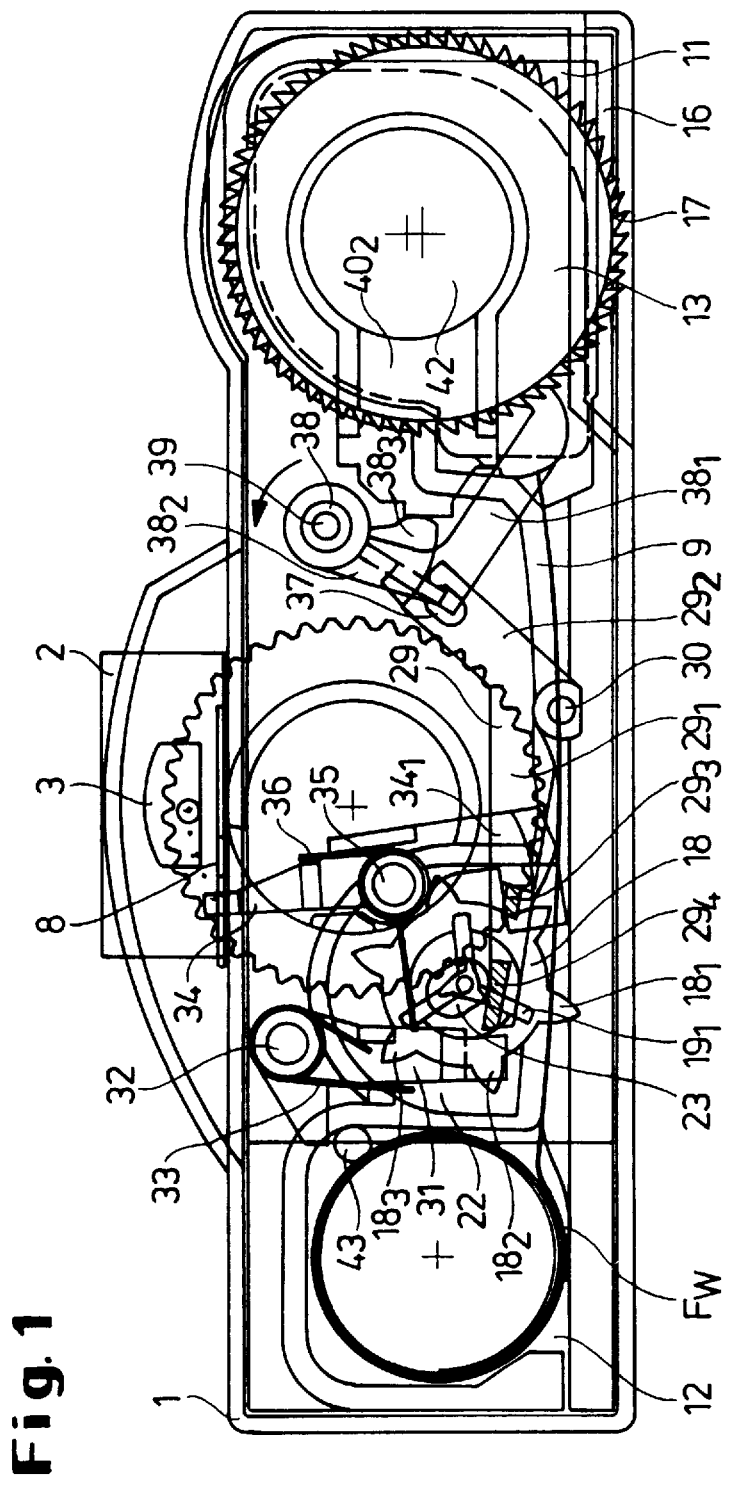

United States Patent [19]
Schröder

[11] Patent Number: 5,842,068
[45] Date of Patent: Nov. 24, 1998

[54] PHOTOGRAPHIC RECORDING OR REPRODUCING DEVICE

[75] Inventor: Rolf Schröder, Zorneding, Germany

[73] Assignee: Agfa-Gevaert AG, Germany

[21] Appl. No.: 935,580

[22] Filed: Sep. 23, 1997

Related U.S. Application Data

[63] Continuation of Ser. No. 705,216, Aug. 29, 1996, abandoned.

[30] Foreign Application Priority Data

Sep. 7, 1995 [DE] Germany ............... 195 33 037.4

[51] Int. Cl.$^6$ ........................................................ G03B 1/18
[52] U.S. Cl. ............................ 396/411; 396/284; 396/395
[58] Field of Search .................. 396/6, 24, 387, 396/394, 395, 401, 411, 412, 284

[56] References Cited

U.S. PATENT DOCUMENTS

| | | | |
|---|---|---|---|
| 4,022,525 | 5/1977 | Boudouris et al. | 352/187 |
| 4,437,749 | 3/1984 | Ehgartner et al. | 354/214 |
| 5,312,304 | 5/1994 | Vetter et al. | 474/160 |

FOREIGN PATENT DOCUMENTS 3 133 774  4/1983  Germany.
3 719 560  12/1988  Germany.

OTHER PUBLICATIONS

European Search Report, 96 113 675.1.

*Primary Examiner*—David M. Gray
*Assistant Examiner*—Nicholas J. Tuccillo
*Attorney, Agent, or Firm*—Connolly & Hutz

[57] ABSTRACT

The invention relates to a photographic recording or reproducing device, preferably a camera, with a transportation device for the frame-by-frame transportation of a film along a film transportation path and with a film length-measuring device with an engagement member pivotable about an axle for engagement in perforation holes along a perforated edge of the film, the film transportation device being locked when the film reaches a position during the course of its transportation for recording or reproducing an image, the engagement member containing a leading engagement element in relation to its rotary movement and a following support element and being adjustable transversely to the film transportation path as a function of the support of the support element on a surface extending parallel to the film transportation path.

21 Claims, 12 Drawing Sheets

PHOTOGRAPHIC RECORDING OR REPRODUCING DEVICE

This application is a continuation of Ser. No. 08/705,216, now abandoned, filed Aug. 26, 1996.

The invention relates to a photographic recording or reproducing device, preferably a camera, having the features of the preamble of claim 1.

There are numerous cameras having a transportation device for the frame-by-frame transportation of a film along a film transportation path and having a film length-measuring device with an engagement element which is rotatable about an axle for engaging in perforation holes along a perforated edge of the film, the film transportation device being locked when the film reaches a position during its transportation for recording an image.

Cameras of this type are predominantly designed for the use of film cassettes of the "135" manufacturing series and allow for single image or series image recordings. In this system, the film comprises perforation holes along each of its two longitudinal edges, which holes are spaced uniformly apart by a relatively small distance. However, the perforation holes do not provide any direct reference to the positioning of the successive photographic recordings on the film. There is therefore no fixed or predetermined association between the individual recordings and particular perforation holes along the perforated edge of the film. A film transportation device is used in association with a film length-measuring device for advancing the film in stepwise fashion. The film length-measuring device comprises a perforation wheel (referred to in the following as a sprocket wheel), which engages with its teeth in the film perforations and is rotated either by the actuating device for the film transportation or by the moving film per se as a result of the engagement of the sprocket wheel in the film perforations, and by cooperating with a gearing determines the length of transportation path covered by the film per photographic recording.

Furthermore, cameras are known which are designed for film cassettes of the "126" or "110" manufacturing series. In these systems, a single perforation hole per photographic recording is provided along one of the film edges, each photographic recording having a fixed position in relation to the respective associated perforation hole. In order to advance the film in stepwise fashion, the path of the perforation holes is scanned in the camera by a resiliently abutting feeler, a locking device of the camera locking the film transportation whenever the feeler drops into a perforation hole. During or following the recording of a photographic image, the feeler is lifted again from the respective perforation hole, so that the film can then be advanced by one frame for the following recording or to the end of the film following the final exposure.

It is the object of the invention to provide a photographic recording or reproducing device and preferably a camera of the initially-mentioned type, in which a film is used belonging to a system having a fixed association of frame positioning and perforation holes.

Figure 13:
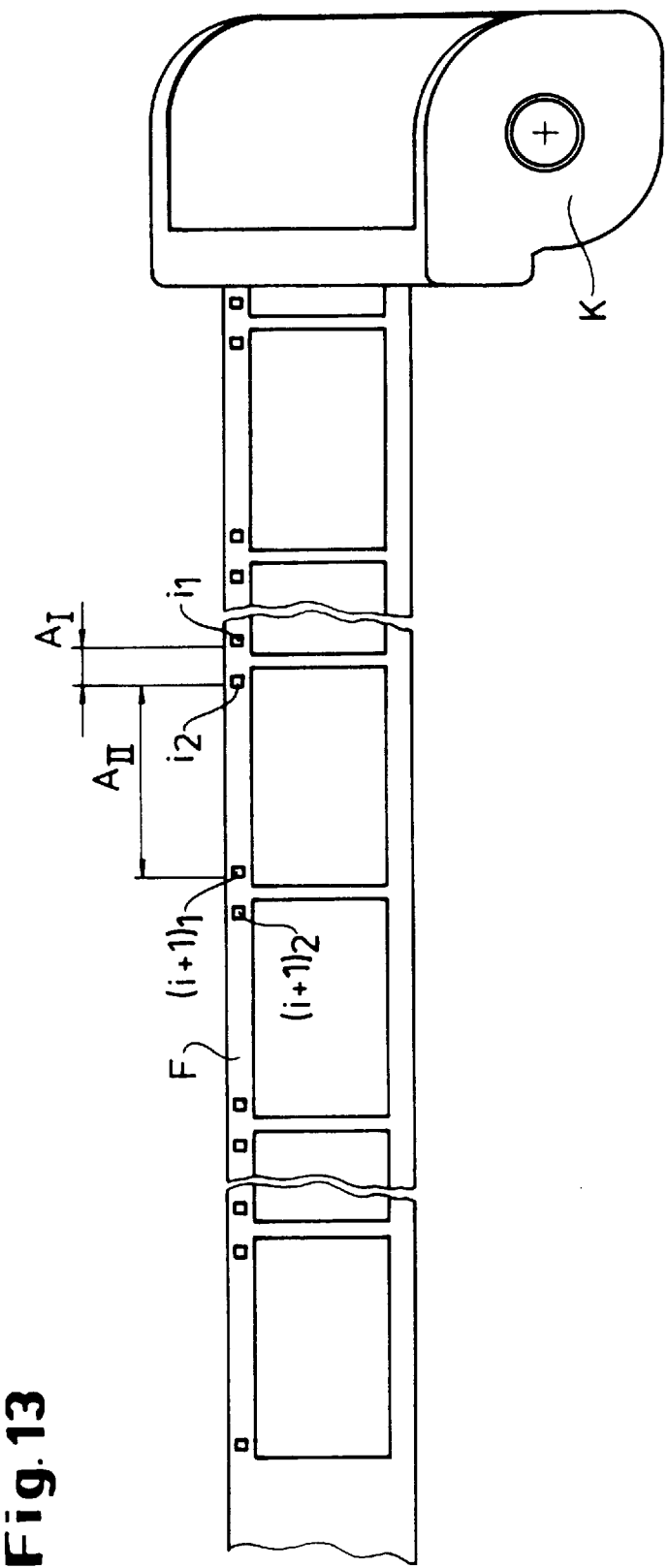

The device according to the invention is preferably intended for the use of films of the manufacturing type as schematically illustrated in FIG. 13 of the drawings. In the case of this manufacturing type, the film F, which can be withdrawn from a supply cassette K, comprises two perforation holes $i_1$, $i_2$ per frame along one of its two longitudinal edges, which holes are arranged behind one another in the transportation direction in the vicinity of the web between two successive frames of the film. Provided between the successive perforation holes of each such perforation hole pair $i_1$, $i_2$ is a comparatively small distance $A_I$, whilst the distance $A_{II}$ between the second perforation hole $i_2$ of a perforation hole pair $i_1$, $i_2$ of a frame and the first perforation hole $(i+1)_1$ of the perforation hole pair $(i+1)_1$, $(i+1)_2$ of the subsequent frame is comparatively large and almost corresponds to the length of a frame. In this respect, $1<i<n-1$, where n expresses the overall number of frames provided on the film F.

The object is attained according to the invention by the features of the characterising part of claim 1.

Further developments of the invention are contained in the subclaims.

Preferred embodiments of the invention are explained in further detail in the following with the aid of FIGS. 1 to 12 of the drawings.

Figure 2:
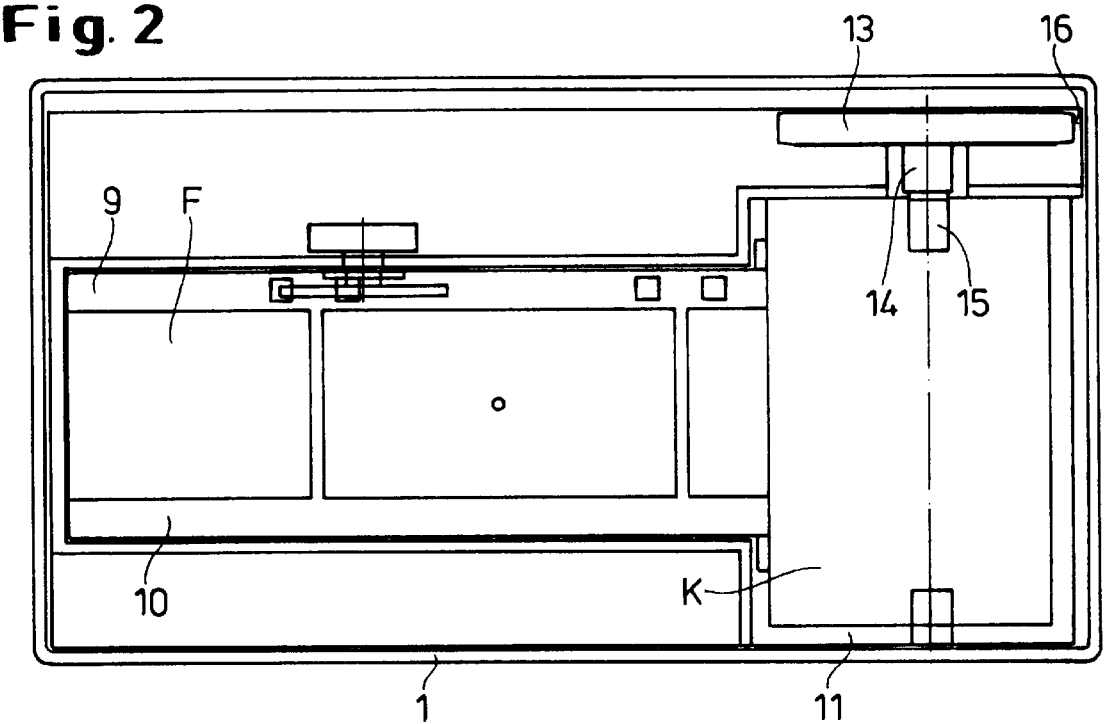
Figure 3:
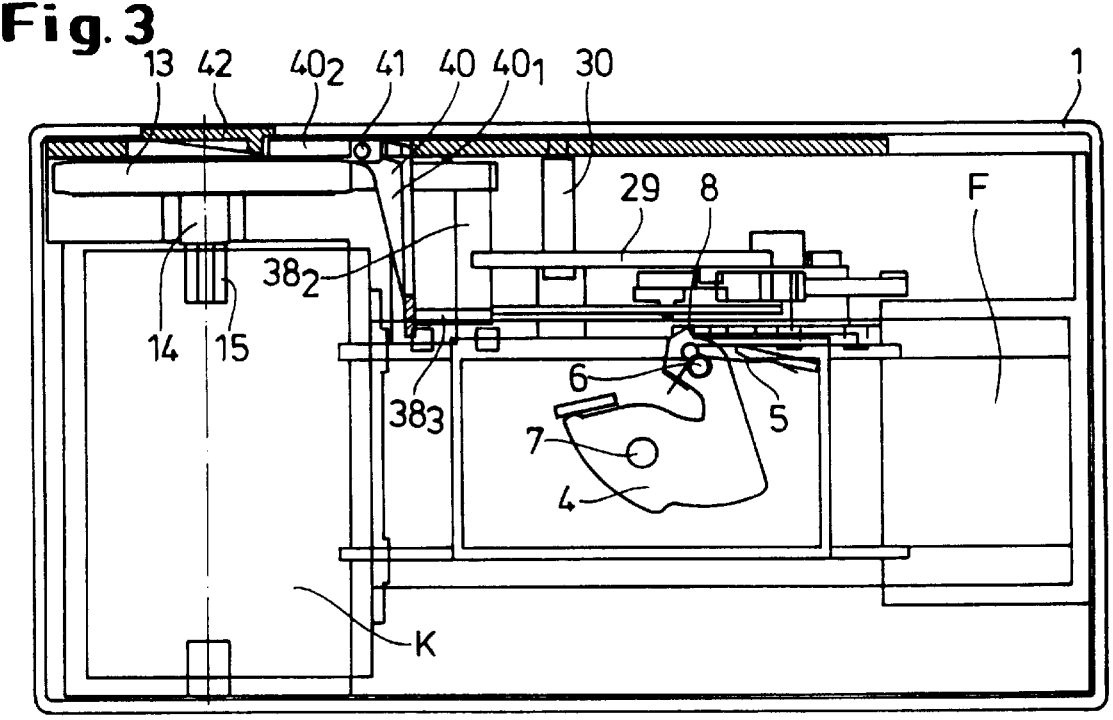
Figure 4:
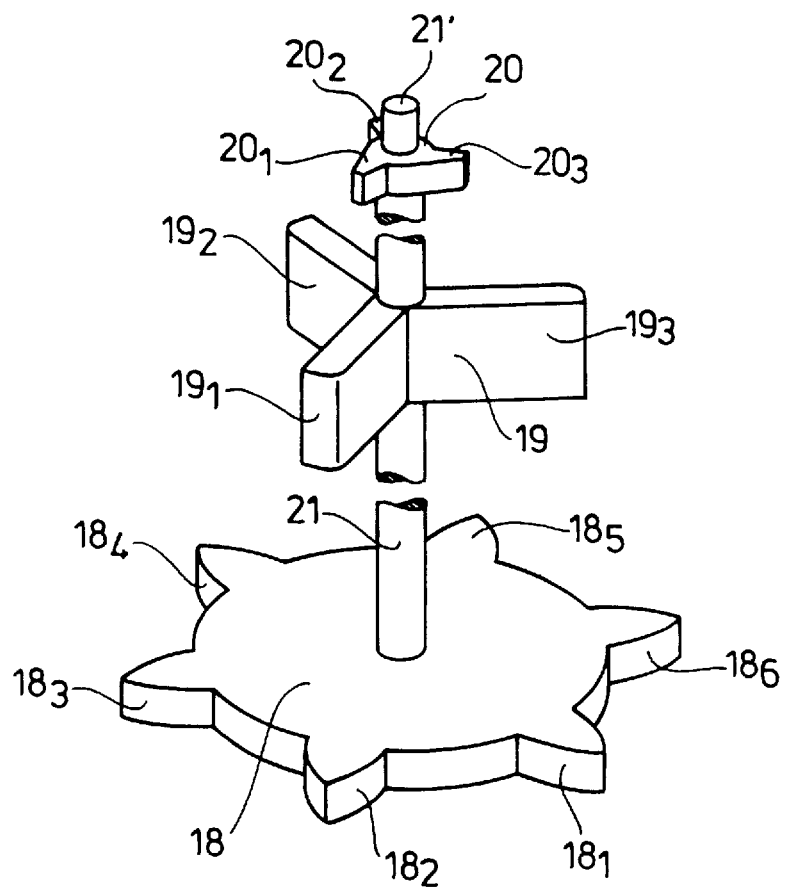
Figure 5:
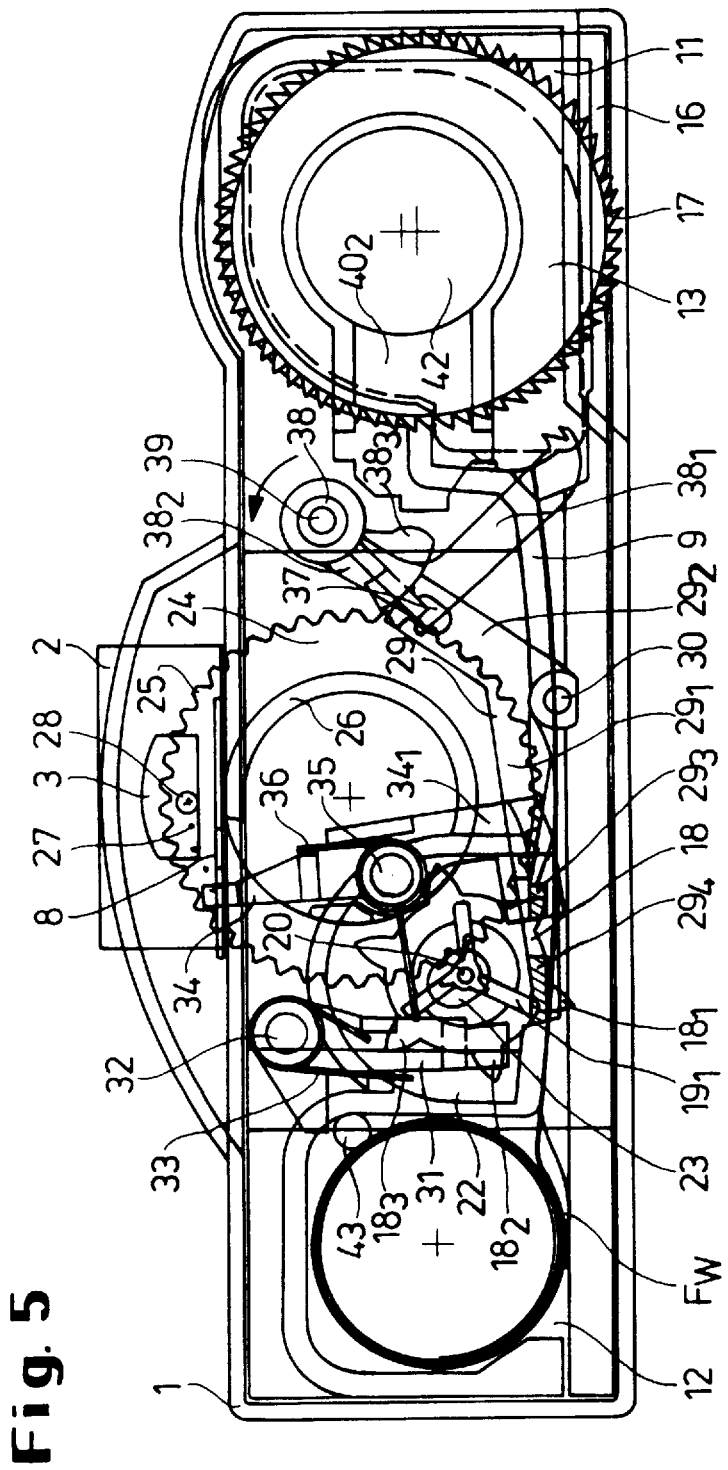
Figure 6:
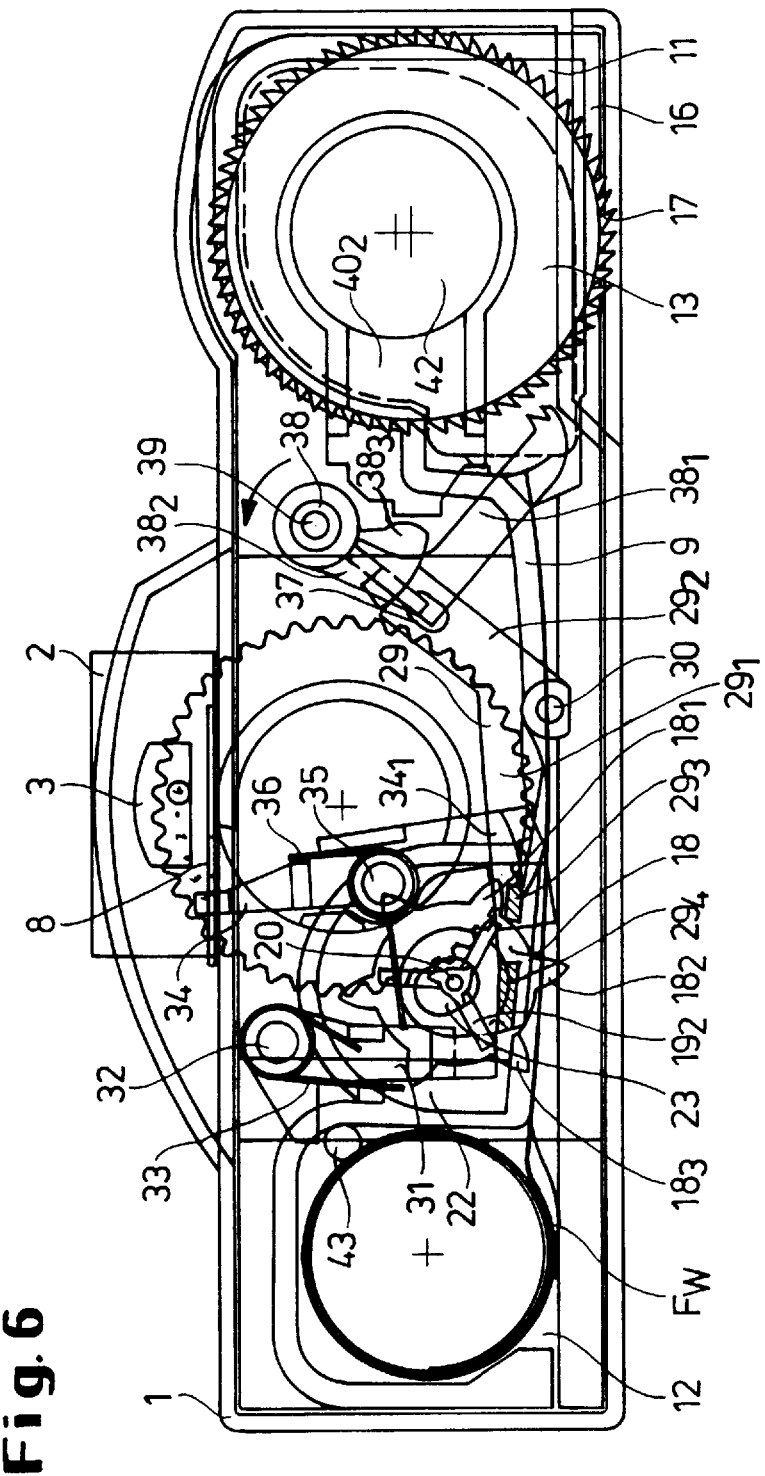
Figure 7:
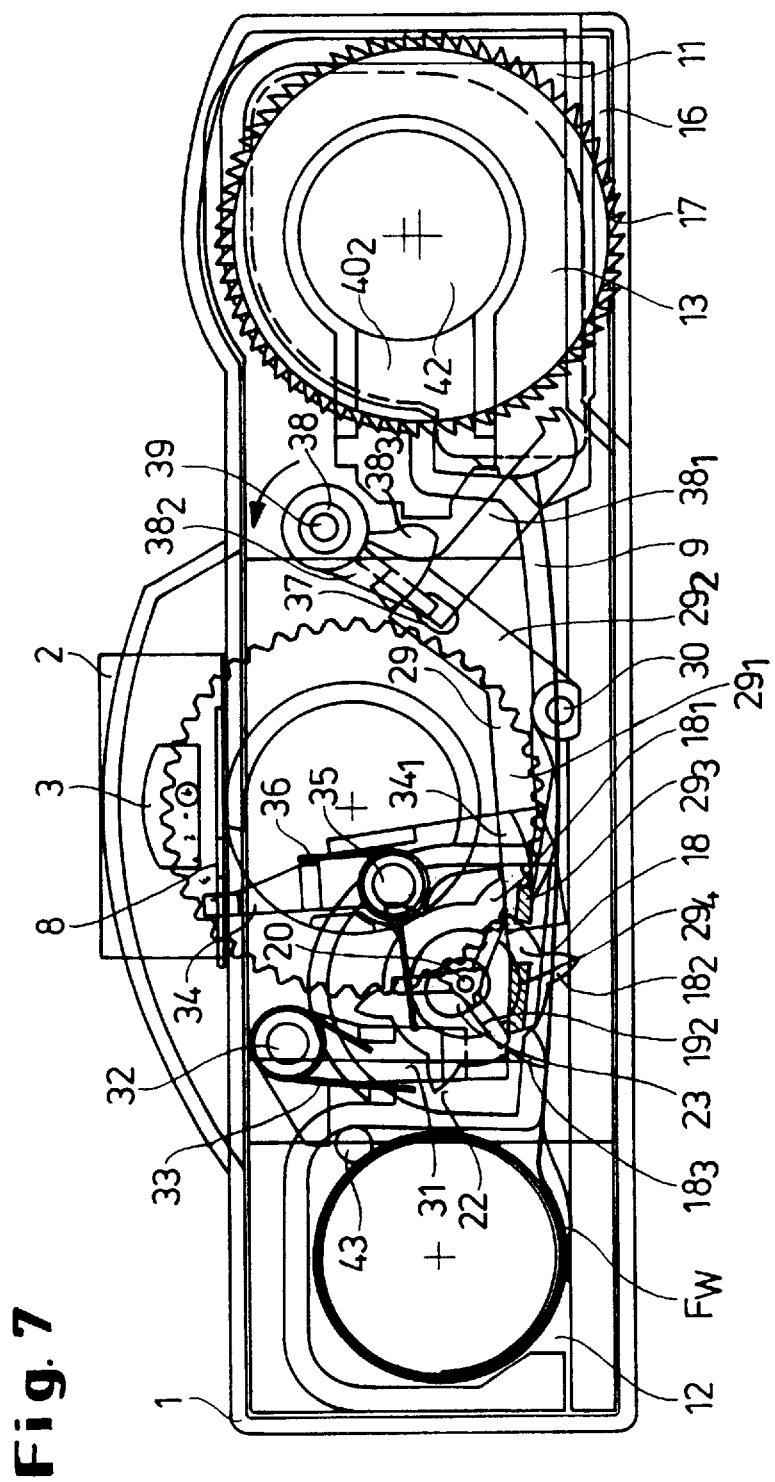
Figure 8:
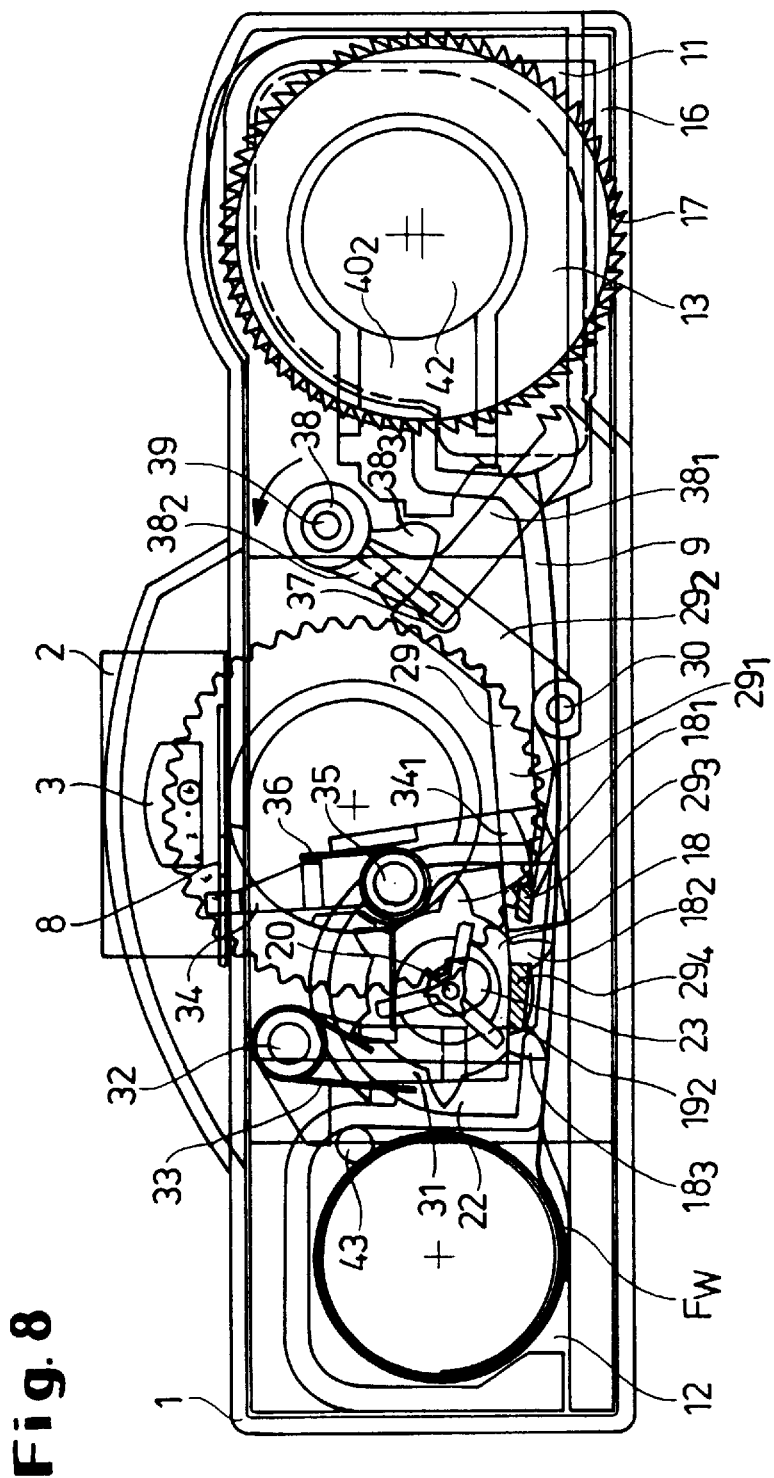
Figure 9:
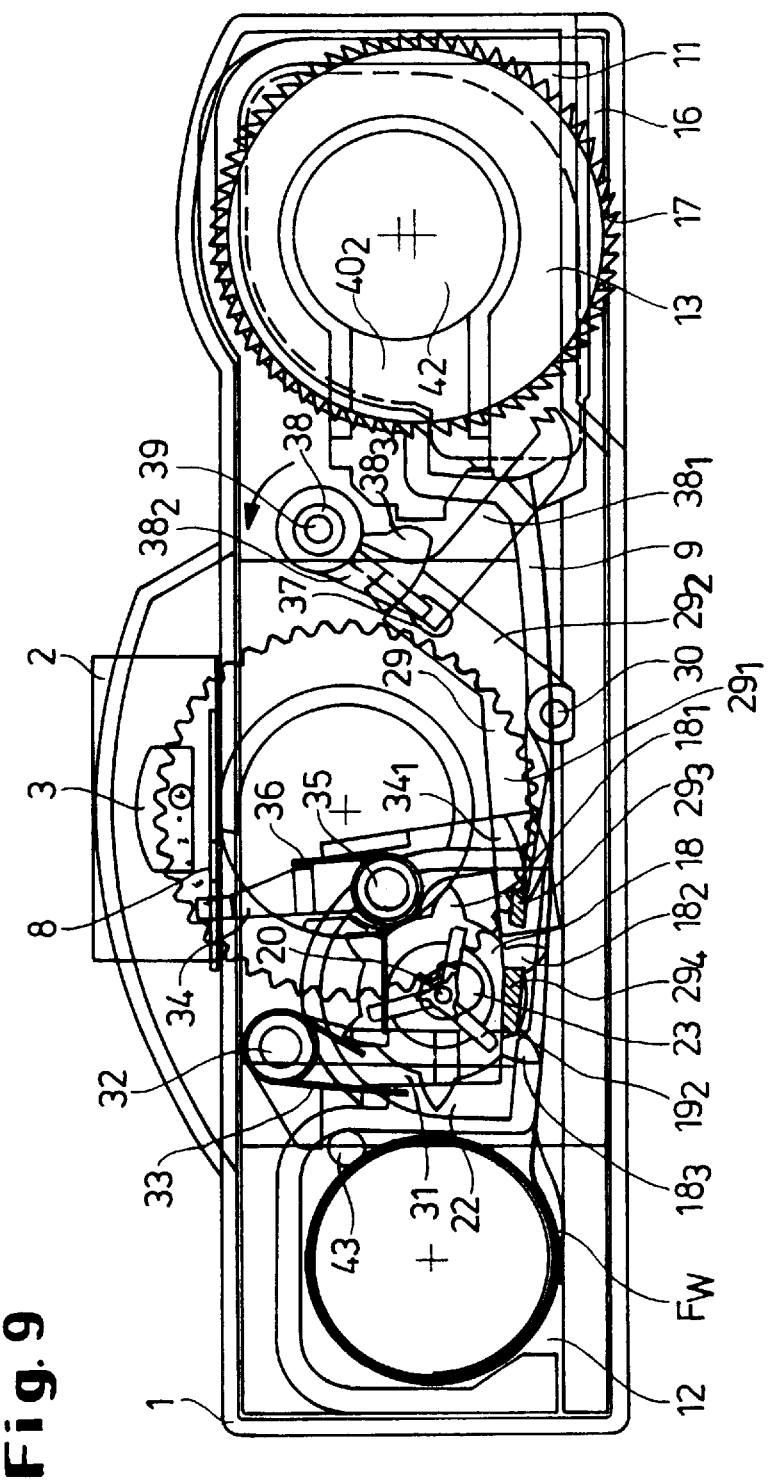
Figure 10:
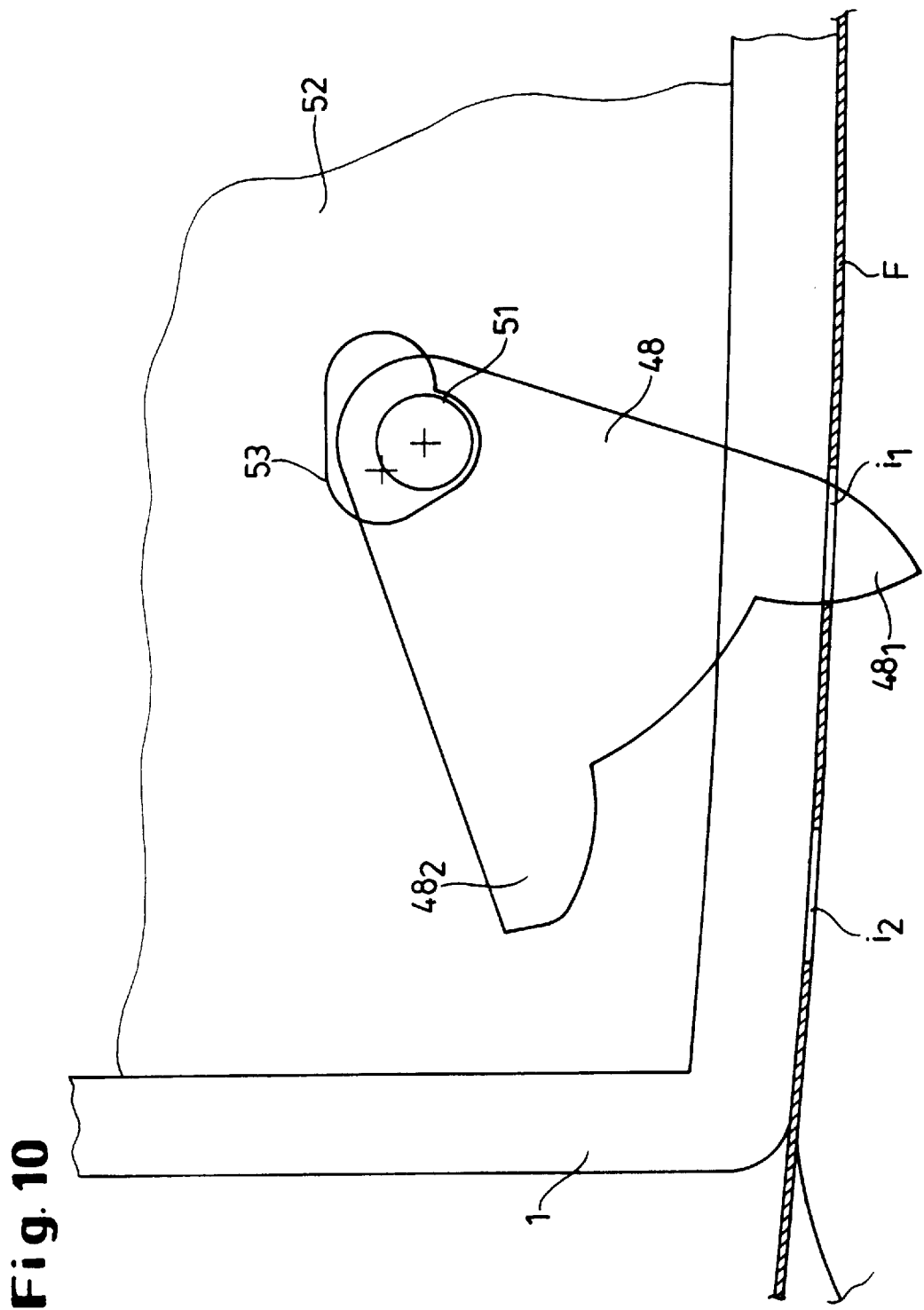
Figure 11:
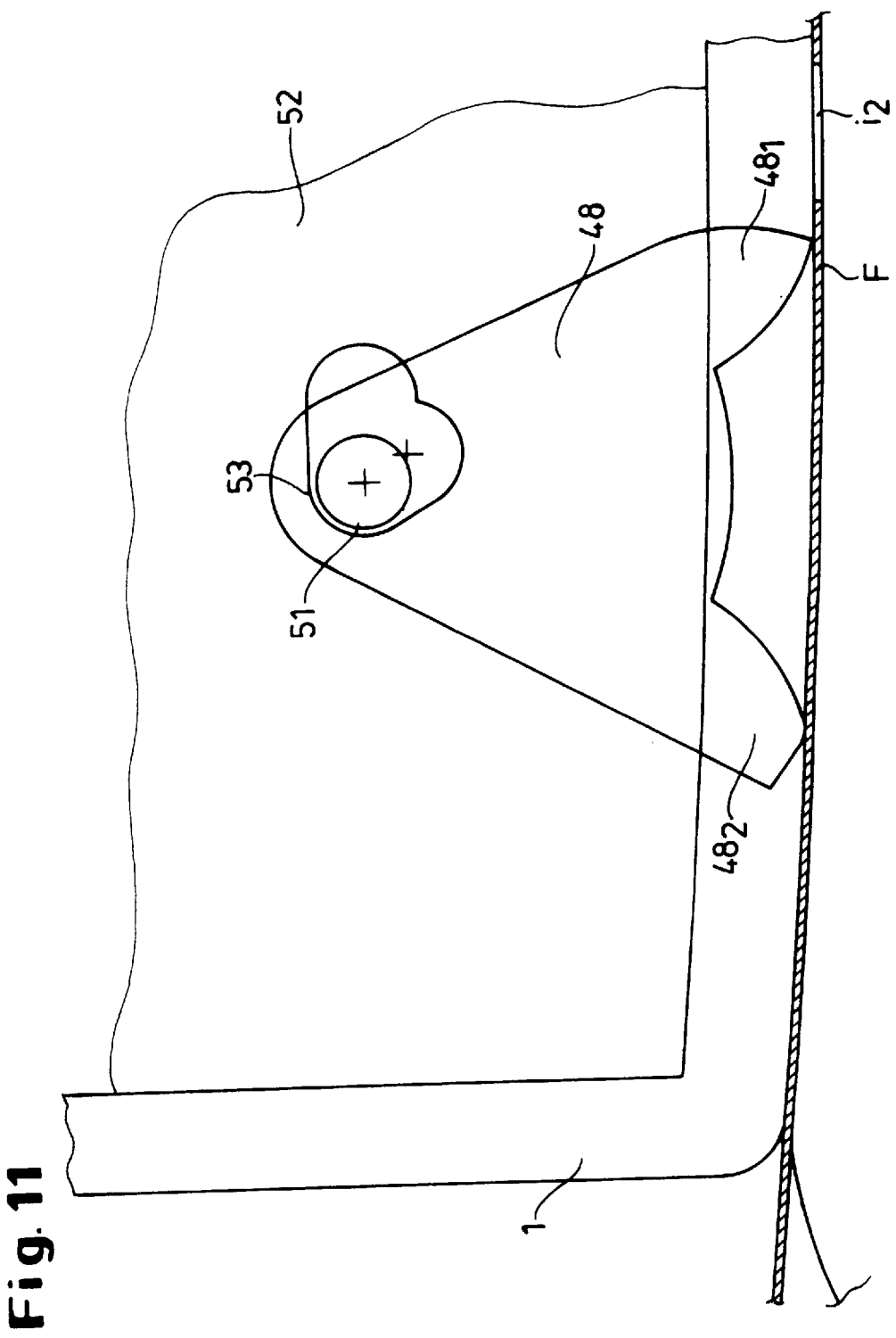
Figure 12:
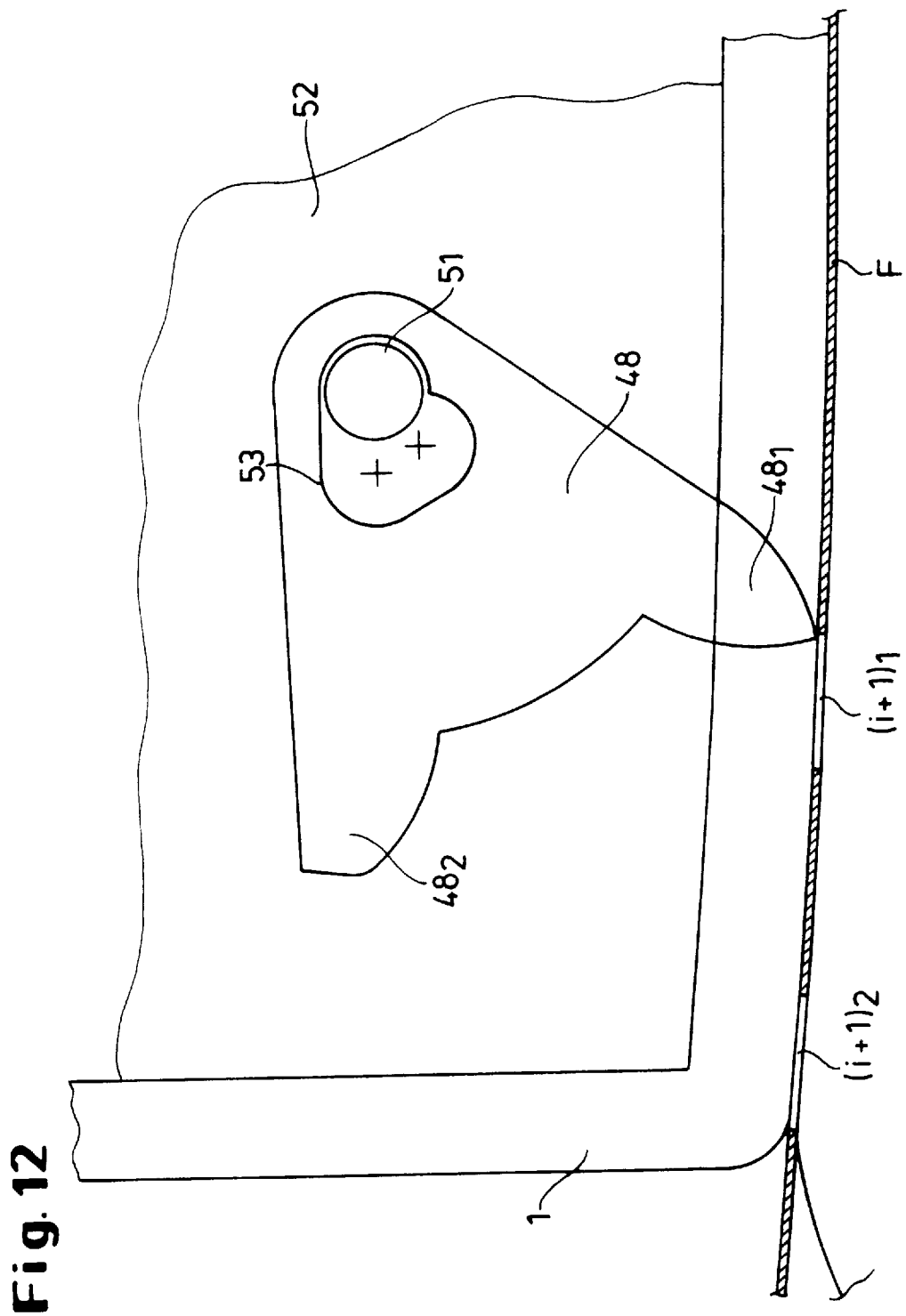

In the drawings, which are schematic illustrations:

FIG. 1 is a top view of a first embodiment of a camera according to the invention with the upper housing section removed and with the camera in the operating state in which it is ready to carry out a photographic recording, FIG. 2 is a rear view of the camera according to FIG. 1 with the rear housing section removed, FIG. 3 is a front view of the camera according to FIG. 1 with the front housing section removed, FIG. 4 is a perspective, exploded view of a set of indexing gears of the camera according to FIG. 1, FIG. 5 shows the subject matter according to FIG. 1 in the operating state immediately after carrying out a photographic recording, FIG. 6 shows the subject matter according to FIG. 1 in the operating state of the film transportation in which the film is in a first intermediate position in order to prepare for a second recording following an exposure, FIG. 7 shows the subject matter according to FIG. 1 in the operating state of the film transportation in which the film is in a subsequent second intermediate position, FIG. 8 shows the subject matter according to FIG. 1 in the operating state of the film transportation in which the film is in a subsequent third intermediate position, FIG. 9 shows the subject matter according to FIG. 1 in the operating state of the film transportation in which the film is in a subsequent fourth intermediate position shortly before reaching the position for the next photographic recording, FIG. 10 shows parts of the film length-measuring device of a further embodiment of a camera according to the invention in the operating state immediately after carrying out a photographic recording, FIG. 11 shows the subject matter according to FIG. 10 in a subsequent operating state during the subsequent film transportation movement, FIG. 12 shows the subject matter according to FIG. 10 in the operating state in which the film has reached a position shortly before the end of the advance movement by one frame, and FIG. 13 shows a film cassette with film of the above-described manufacturing type having two perforation holes per frame.

A first embodiment of a device according to the invention, constructed as a camera, will firstly be described with reference to FIGS. 1 to 9 of the drawings, the device being shown schematically in different operating states in FIG. 1 and in FIGS. 5 to 9.

In this respect, the reference numerals for the further description of the frame counting device of the camera explained in further detail below are only included in FIG.

5, and are omitted in FIG. 1 and in FIGS. 6 to 9 for the sake of clarity of the drawings and description of other parts and assemblies of the camera. However, the frame counting device is not only shown in FIG. 5, but also in FIG. 1 and FIGS. 6 to 9, so that the reference numerals in FIG. 5 referring to this device are also applicable to the corresponding parts of the frame counting device in FIG. 1 and FIGS. 6 to 9.

The first embodiment of a camera according to the invention shown in FIGS. 1 to 9 of the drawings comprises a camera housing 1 with a lens tube 2. Arranged in the lens tube 2 is a lens 3 which is merely shown schematically for recording a photographic subject on a photographic film inserted in the camera, and a photographic shutter 4 for exposing the film frame-by-frame for an exposure time determined by the duration of opening of the shutter 4. As shown in FIG. 3, the shutter 4 is preferably formed by a single plate with an exposure aperture 7. The plate can be pivoted by the action of a spring 5 about an axis 6 fixed to the housing and projects with an abutment 8 forming a shutter actuating member from the lens tube 2 into the upper housing section of the camera. Instead of the single-plate shutter, a multi-plate lens shutter can be provided, or even a slotted shutter arranged in front of a flat image plane, particularly in cases where the camera is constructed as a reflex camera. A preferably adjustable aperture stop, not shown, can be separately provided in the lens tube 2 as a lens stop or can be formed during the opening movement of a photographic, multi-plate shutter, so that it is then a stop shutter.

The film F inserted in the camera is preferably of the manufacturing type shown in FIG. 13 and is guided with its upper and lower edges in the region of a recording image window in the camera by means of two curved film guide runners 9, 10, which in this region form a film guide path which is concave in relationship to the recording lens 3. This facilitates the compensation of imaging errors of the lens 3 and thus allows for a simplification of the lens construction. However, a flat film guide path can also be provided in conventional fashion.

In the illustration of FIG. 1 and in FIGS. 5 to 9 of the drawings, the film F is transported stepwise from left to right in order to carry out successive photographic recordings. In preparation for the above, after the insertion of a film cassette K into a cassette receiving chamber 11, which is arranged on the right-hand side of the camera housing 1 and is accessible from the outside through a loading flap on the bottom of the camera, not shown, the unexposed film is pushed out of the film cassette and is transported from right to left without exposure, so that it is stored in a film storage chamber 12 in the camera housing 1 arranged on the left side to form a loose film roll $F_w$. However, the film end remains secured in a film reel which is arranged inside the film cassette K and is not illustrated in the drawings. This state is referred to in the following as the film loading state.

The above-described preparatory film transportation from the film cassette K to the film storage chamber 12 can be effected by the manual clockwise rotation of a film transportation wheel 13, which is provided on the camera with its shaft 14 rotatably mounted in the camera housing 1. To this end, during the insertion of the film cassette K into the cassette receiving chamber 11 in the camera housing 1, a coupling element 15 provided on the shaft 14 of the film transportation wheel 13 engages in a manner known per se with a coupling element (not shown) arranged at the end face of the film cassette and belonging to the film reel contained in the film cassette, so that when the film transportation wheel 13 is rotated, the film reel of the film cassette K coupled thereto also rotates at the same time.

If the camera is already supplied by the manufacturer with unexposed film (photographic film pack supplied with lens), then the film F can be fitted from the onset in the camera in such a manner that the film loading state described above is achieved.

Proceeding from this film loading state, as successive photographic recordings are made the film F is transported back from the film storage chamber 12 in the camera housing 1 from left to right during the step-by-step image exposure to the film cassette receiving chamber 11 and is wound back into the film cassette K, to which end the film reel of the film cassette K is rotated in the winding-on direction. This is effected by a manual rotation of the film transportation wheel 13 with its shaft 14 in an anticlockwise direction.

In order to allow for and to facilitate manual actuation of the film transportation wheel 13 by the camera user, the film transportation wheel 13 projects somewhat towards the outside with part of its circumference through a recess 16 in rear of the camera housing 1 and comprises a milled edge 17 on its outer circumference.

The film transportation wheel 13 thus forms an actuating device for the film transportation. This actuating device can also be modified from the illustrated construction as a film transportation wheel in a manner known per se to form a quick-action lever, for example. In cameras having a motor drive, the actuating device can also be constructed as a motor-driven film transportation device.

A film length-measuring device arranged in the camera housing 1 comprises a perforation wheel 18 (referred to in the following as a sprocket wheel) acting as an engagement member, a cam wheel 19 acting as a film transportation switching member and an indexing gear 20 acting as a frame counter switching member, these components being arranged above one another, preferably in close proximity, on a common shaft 21 or even being constructed as an integrally formed assembly. The assembly illustrated in the plan view of FIG. 1 and FIGS. 5 to 9 with the sprocket wheel 18, cam wheel 19, indexing gear 20 and common shaft 21 is also shown in perspective in the enlarged view according to FIG. 4 in order to better illustrate this assembly. The assembly is arranged with its shaft 21 in the camera housing 1 within a slot 23 provided in a housing partition 22 so that it is displaceable transversely to the film transportation path formed by the film guide runners 9, 10, and therefore also transversely to the transportation direction of the film F. The assembly is acted upon by a spring, not shown, which can displace the assembly in the direction of the film transportation path, so long as this movement is allowed by the slot 23 and so long as the assembly is not otherwise impeded in this movement in certain camera operating states in a manner which will be described in further detail below.

As can be seen in particular in FIG. 4, the sprocket wheel 18 in the embodiment illustrated in FIGS. 1 to 9 of the drawings comprises six radially outwardly pointing teeth $18_1$ to $18_6$, which are distributed over the circumference of the sprocket wheel 18 at uniform reciprocal angular distances of 60° apart and are thus designed in such a manner that they can engage in perforation holes in the film F when the film F passes the sprocket wheel 18 during its transportation in the operating states according to FIGS. 1, 5, 6 and 7. In this respect, the circumferential distance between two adjacent teeth of the sprocket wheel 18 corresponds to the short distance $A_1$ between two perforation holes of each perforation hole pair $i_1$, $i_2$ in the film F of the manufacturing type illustrated in FIG. 13.

The star-shaped cam wheel 19 acting as a film transportation switching member comprises three relatively long cams or teeth $19_1$, $19_2$, and $19_3$, which are arranged uniformly offset relative to one another through an angle of 120° in each case, approximately overlapping the respective alternative teeth $18_2$, $18_4$, $18_6$ of the sprocket wheel 18, and cooperate with adjacent levers 29 and 31 in a manner described in further detail below. The cam wheel 19 can also have the form of a conventional cam disc as used in gearing construction with a number of cams corresponding to the number of teeth $19_1$ to $19_3$.

The indexing gear 20 acting as a frame counter switching member comprises three short switching teeth $20_1$, $20_2$, and $20_3$, which are also spaced apart by an equal angular distance of 120° in each case and can engage between teeth of a gear rim 25 of a rotatable frame counting disc 24, which is arranged on an axle fixed to the housing or on a shaft 26 rotatably mounted in the housing. The frame counting disc 24 carries display markings 27 corresponding to the numerical sequence of frames on the film F and is visible with a display marking in each case through a window 28 in the camera housing 1.

One of the two above-mentioned levers 29, 31 forms a two-arm intermediate lever 29, which is pivotable under the action of a spring about an axle 30 fixed to the housing. The other lever 31 forms a locking lever, which is upwardly cranked at its free end, is pivotable about an axle 32 fixed to the housing and is loaded by a spring 33.

The intermediate lever 29 cooperates via a lever arm $29_1$ both with the above-mentioned locking lever 31 and with a shutter drive device 34, which is preferably constructed as a shutter drive lever, is rotatable in a clockwise direction under the action of a spring 36 about an axle 35 fixed to the housing and is capable of driving the abutment 8 of the photographic shutter 4 by acting as the shutter actuating member. In its position according to FIGS. 1 and 5, the locking lever 31 does not influence the intermediate lever 29, whilst in its position according to FIGS. 6, 7 and 8 it locks the intermediate lever 29 against rotation in a clockwise direction.

A lever arm $38_2$ of a pivotable pawl lever 38 engages in a recess 37 in the second lever arm $29_2$ of the intermediate lever 29, the pawl lever 38 comprising three lever arms $38_1$, $38_2$ and $38_3$, which are arranged one above the other on a shaft 39. During anti-clockwise rotation, the lever arm $38_1$ of the pawl lever 38 engages in the manner of a pawl in the milled edge 17 of the film transporting wheel 13, in order to lock the wheel against actuation in the direction of the frame-by-frame film transportation, whilst the film transportation wheel 13 is released for actuation for the frame-by-frame film transportation when the pawl lever 38 is rotated in a clockwise direction.

As is shown partially in FIG. 3 and partially in FIG. 1 and FIGS. 5 to 9, the pawl lever 38 rests with its lever arm 383 resiliently against a downwardly angled arm $40_1$ of an angular release lever 40, which is pivotable about an axle 41, which is fixed to the housing and is parallel to the lens axis, and on its other arm $40_2$ carries a release button 42, which is arranged for manual actuation by the camera user on the upper side of the camera above the film transportation wheel 13, without being securely connected thereto.

The described length-measuring device of the camera operates as follows:

When the camera is in the operating state in which it is ready to take a photographic recording, the above-described gearing arrangement adopts the operating state illustrated in FIG. 1. In this case, the shutter drive lever 34 rests with an upwardly projecting flap $34_1$ against a downwardly pointing projection $29_3$ of the intermediate lever 29 and is thereby locked against the force of the spring 36 against rotation in the clockwise direction. The film transportation wheel 13 is also locked against rotation in the anti-clockwise direction and therefore against unintentional film transportation as a result of the engagement of the lever arm 38, of the pawl lever 38 in the milled edge 17. The cranked locking lever 31 rests against the tooth $19_2$ of the cam wheel 19. The tooth $18_1$ of the sprocket wheel 18 engages in the first, leading perforation hole $i_1$ of a perforation hole pair $i_1$, $i_2$ of the film F fitted in the camera.

In order to trigger a photographic recording, i.e. in order to move into the operating state according to FIG. 5, the release button 42 is pressed downwards by the camera user, so that the release lever 40 is pivoted against the restoring force of its spring about the axle 41 in an anti-clockwise direction in the illustration according to FIG. 4. This produces a pivoting of the pawl lever 38 in a clockwise direction in the illustration according to FIGS. 1 and 5 to 9, which on the one hand results in a release of the film transportation wheel 13 and on the other hand a pivoting of the intermediate lever 29 in an anti-clockwise direction. Consequently, the projection $29_3$ of the intermediate lever 29 disengages from the projection $34_1$ of the shutter drive lever 34. This releases the shutter drive lever 34, so that it is driven under the action of its spring 36 in a clockwise direction out of its tensioned position, strikes the abutment 8 of the shutter 4 and drives said abutment 8 until it runs over the abutment 8 rotating about the axle 6. In this respect, the photographic shutter 4 arranged in the lens tube 2 effects an opening and closing movement by way of a reciprocating motion and thus effects an image exposure of the section of the film F located in the exposure window in the camera housing 1. In this manner a photographic recording is made. The locking lever 31 remains inoperative during this process.

When the film F is subsequently transported by one frame gauge, a first intermediate position according to an operating state shown in FIG. 6 is firstly reached. To this end, the film transportation wheel 13 released by the pawl lever 38 is rotated by manual actuation in an anti-clockwise direction, so that the film F is transported to the right over a first partial distance of a frame gauge. In so doing, the sprocket wheel 18 is driven by the film as a result of the engagement of the tooth $18_1$ of the sprocket wheel 18 in the perforation hole $i_1$, of the film F, the above-mentioned tooth $18_1$ of the sprocket wheel 18 only emerging from the perforation hole $i_1$ once the following tooth $18_2$ of the sprocket wheel 18 has entered the perforation hole $i_2$ of the perforation hole pair $i_1$, $i_2$ of the film F, thereby ensuring that the sprocket wheel 18 is further driven by the film F when the film transportation wheel 13 is further rotated.

Owing to the fact that the cam wheel 19 participates with its teeth in the anti-clockwise rotation of the sprocket wheel 18 produced by the movement of the film F as a result of the rigid connection of the cam wheel 19 with the sprocket wheel 19 via the shaft 21, the tooth $19_1$ of the cam wheel 19, which is initially angled downwards to the left, reaches an end flank of the shutter drive lever 34 and rotates the latter, overcoming the force of its spring 36, back into the initial tensioned position, in which the shutter drive lever 34 is held again with its projecting flap $34_1$ by the projection $29_3$ on the intermediate lever 29.

On the other hand, during the above-described anti-clockwise rotation of the cam wheel 19, the locking lever 31 is released from the tooth $19_2$ of the cam wheel 19, so that this locking lever 31 rotates in an anti-clockwise direction under the action of its spring 33, until it comes to rest upon an abutment 43 fixed to the housing. In this position, the locking lever 31 locks the intermediate lever 29 with its projection $29_1$ against a return rotation in the clockwise direction.

This operating state is maintained when the film F is transported further with the further rotation of the film transportation wheel 13, until the next intermediate position illustrated in FIG. 7 is reached and a subsequent tooth $18_3$ of the sprocket wheel 18 comes to rest upon the film F, as illustrated in FIG. 7.

Since the film F in its intermediate position shown in FIG. 7 lies with a region lying between the perforation holes $i_2$ and $(i+i)_1$ opposite the tooth $18_3$ of the sprocket wheel 18, it does not comprise a perforation hole at the site at which the tooth $18_3$ of the sprocket wheel runs onto the film F. Consequently, during the further transportation of the film F, this tooth $18_3$ cannot fall into a perforation hole. On the other hand, during this operating state the preceding tooth $18_2$ of the sprocket wheel 18, which was previously located in the perforation hole $i_2$ of the film F, has not yet left this perforation hole, so that the sprocket wheel 18 continues to be driven by the film. This means that the sprocket wheel 18 is pivoted somewhat with its shaft 21 against the restoring force of the spring acting upon the shaft 21 about the tip of the tooth $18_3$, which has run onto the film F and is supported thereby, so that the shaft 21 describes a short arcuate path in the slot 23 transversely to the film transportation path and therefore transversely to the film transportation direction, and therefore moves somewhat away from the film transportation path, as illustrated in FIG. 8. The slot 23 is arranged and constructed in the housing partition 22 in such a manner that it allows for the above-described transverse adjustment of the shaft 21.

The cam wheel 19 and the indexing gear 20 necessarily participate in the above-described transverse adjustment of the sprocket wheel 18 and the shaft 21, without counteracting the unlocking of the film transportation wheel 13 by the intermediate lever 29.

The above-described transverse movement of the shaft 21 in the form of a movement away from the film transportation path comes to an end when the tooth $18_2$ of the sprocket wheel emerges again from, and leaves, the perforation hole $i_2$ of the film F during the continuing film transportation. The rotational movement of the sprocket wheel 18 and, together therewith, the cam wheel 19 and indexing gear 20 about the longitudinal axis of the shaft 21 is thereby ended, the tooth $18_2$ of the sprocket wheel 18 which has emerged from the perforation hole $i_2$ in the film F according to FIG. 8 resting upon the upper surface of the film during the further transportation of the film. During its further transportation, the film F slides under the teeth $18_2$ and $18_3$ of the sprocket wheel 18 resting upon its upper surface.

Shortly before the end of the film transportation through a full frame gauge, an operating state is reached as illustrated in FIG. 9. In this operating state, the perforation hole (i+1), of the perforation hole pair $(i+1)_1$, $(i+1)_2$, following the perforation hole pair $i_1$, $i_2$ reaches a position directly in front of the tooth $18_3$ of the sprocket wheel 18 sliding towards the hole in the film. With the further rotation of the film transportation wheel 13 and with the corresponding further transportation of the film F, the tooth $18_3$ of the sprocket wheel 18 drops into the perforation hole $(i+1)_1$, the sprocket wheel 18 and, together therewith via the shaft 21, the cam wheel 19 and the indexing gear 20 are moved back in the direction of the film transportation path within the boundaries of the slot 23 and as a result of the lateral guidance through the slot 23 by means of the restoring spring acting upon tile shaft 21. During this process, the tooth $19_3$ of the cam wheel 19 comes to rest upon the flank of the locking lever 31 and rotates the latter against the action of its spring 33 into its inoperative position, so that the projection $29_4$ of the intermediate lever 29 is released again by the locking lever 31, thereby releasing the intermediate lever 29. The latter can thus return under the action of its spring into its starting position by pivoting in a clockwise direction. This effects a return rotation of the pawl lever 38 in the anti-clockwise direction, so that the lever arm $38_1$ again engages in the milled edge 17 of the film transportation wheel 13 and locks the latter against further actuation.

In this manner, the film transportation through a complete frame gauge is complete and an operating state for the subsequent photographic recording is reached, as illustrated in FIG. 1, but with the exception that it is no longer the tooth $18_1$ of the sprocket wheel 18 which engages in the perforation hole $i_1$ of the perforation hole pair $ii_1$, $i_2$, but the next-but-one tooth $18_3$ of the sprocket wheel 18 which engages in the perforation hole (i+1) of the respective subsequent perforation hole pair (i+1) $(i+1)_2$, of the film F, and the teeth of the cam wheel 19 and the teeth of the indexing gear 20 are advanced through 120° in each case. In this operating state, the shutter drive lever 34 is again tensioned and the film transportation wheel 13 is again locked against rotation for frame-by-frame film transportation.

The operating sequence described above with the aid of FIG. 1 and FIGS. 5 to 9 can then be repeated during the subsequent photographic recordings. Just as the teeth $18_1$, $18_2$ and $18_3$ of the sprocket wheel 18 were active in a given transportation cycle, e.g. during the transportation of the film F by a frame gauge in accordance with the above description, in the following transportation cycles the teeth $18_3$, $18_4$ and $18_5$ and then the teeth $18_5$, $18_6$ and $18_1$, etc., are active.

It can be seen from the above description that the sprocket wheel 18 and, together therewith via the shaft 21, the cam wheel 19 and the indexing gear 20 carry out a rotation through 120° per frame gauge. In the course of a 120° rotation of the indexing gear 20 per transportation cycle, one of its three teeth engages with the gear rim 25 of the frame counting disc 24 of the frame counting device, which is particularly visible in FIG. 5, so that the frame counting disc 24 is advanced by one tooth of the gear rim 25 during the course of the film transportation through one frame gauge, and is therefore advanced from one display marker 27 to the next, so that there is a continuous countdown and display of the film sections which are still available on the film F for photographic recordings.

In this respect, care is taken in the above-described embodiment by way of a corresponding arrangement of the teeth of the indexing gear 20 to ensure that the teeth of the indexing gear 20 do not engage in the gear rim 25 of the frame counting disc 24 when the sprocket wheel 18 and, together therewith via the shaft 21, the indexing gear 20 are pivoted within the boundaries of the slot 23 relative to the film path, as in the case in the operating state according to FIGS. 8 and 9. However, as an alternative to this, the transverse adjustment of the indexing gear 20 can also be used for the advancement of the frame counting disc 24 (not illustrated).

In the above-described embodiment, the intermittent rotation of the sprocket wheel 18 and the other switching elements 19 and 20 arranged on its shaft 21 is effected in individual phases of the movement sequence during the transportation of the film F through a frame gauge in that the sprocket wheel 18 is driven by the film F as a result of the alternate engagement of its teeth in the film perforations when the film is driven in the transportation direction. However, as an alternative to this, the shaft 21 with the switching elements 18, 19 and 20 arranged thereon can also be driven so as to rotate by the film transportation wheel 13 via a connecting gearing, not shown in the drawings, with the interposition of a slip clutch, the film F merely taking control of the intermittent rotary movement as a result of the alternate engagement of teeth of the sprocket wheel 18 in the film perforations and the teeth of the sprocket wheel 18 resting upon the film web.

The number z of teeth of the sprocket wheel 18 does not necessarily need to be six, but can be a different number greater than six or even less than 6. In general, z=2m where $m \geq 2$. In this respect, the number of cams of the cam wheel 19 and of the indexing gear 20, which are spaced apart by uniform angular distances, is equal to m, i.e. half the number of teeth of the sprocket wheel 18. However, the circumferential distance between two adjacent teeth of the sprocket wheel 18 is equal in each case to the distance $A_1$ between the perforation holes of each perforation hole pair $i_1, i_2$ of the film F.

The above-described solution can generally be used in the frame-by-frame advancement of films having perforation holes with shorter and longer reciprocal spacing, the circumferential distance between adjacent teeth of the sprocket wheel 18 of the camera corresponding to the shorter distance between successive perforation holes in the film.

The above-described embodiment embodies by way of example the general teaching that a rotatable engagement member is formed by the sprocket wheel 18, which member is adjustable transversely to the film transportation path, and therefore also transversely to the transportation direction of the film F. Successive teeth of the sprocket wheel 18 forming the engagement member act as an advancing engagement element for engaging in a perforation hole in the film and a following support element, by means of which the engagement member is supported on the film or, as described below in further detail, on a surface which is fixed to the housing and parallel to the film, and as a function of this support effects the pivoting of its pivot axis transversely to the film transportation path and film transportation direction when the engagement member rotates. For example, in the operating states according to FIG. 1 and FIGS. 5 to 9, a first engagement element is formed by the tooth 18, and a second engagement element is formed by the tooth $18_2$ of the sprocket wheel 18, whilst a support element is formed by the tooth $18_3$ of the sprocket wheel 18. In this respect, the support element formed by the tooth $18_3$ in the film transportation cycle according to FIG. 1 and FIGS. 5 to 9 forms a first engagement element in the subsequent film transportation cycle, i.e. during the next frame step as part of the active sequence of engagement and support elements $18_3$, $18_4$ and $18_5$ which are then effective in a similar manner to the sequence of engagement and support elements $18_1, 18_2$ and $18_3$ in the preceding film transportation cycle. As a result of an engagement element becoming temporarily active, the engagement member is intermittently caused to rotate and as a result of the engagement element and support element simultaneously becoming active in the interim is pivoted transversely to the film transportation path and film transportation direction.

Furthermore, the above-described embodiment according to FIGS. 1 to 9 embodies by way of example the general teaching that the engagement member constructed in this case in the form of the sprocket wheel 18 cooperates with the film transportation switching member constructed in this case as the cam wheel 19 in such a manner that, with the transverse displacement of the engagement member away from the film transportation path, a previously effected unlocking of the film transportation wheel 13 or a different film transportation device is firstly maintained, but is then lifted again so as to provide renewed locking when the engagement member is adjusted back in the direction of the film transportation path.

The above-described embodiment according to FIGS. 1 to 9 also embodies by way of example the general teaching that the engagement elements and support elements of the engagement member constructed in this case in the form of the sprocket wheel 18 can also act alternately, by exchanging function, as support elements and engagement elements, so that the engagement element can be constructed in the same manner to act as engagement element or support element and can therefore have a simple design. More particularly, the engagement elements and support elements of the engagement member can be of like construction.

A further, if somewhat less simple embodiment of a device according to the invention, again constructed as a camera, is described in the following with reference to FIGS. 10 to 12 of the drawings.

This camera corresponds in its general structure to the above-described first embodiment and is therefore no longer illustrated in FIGS. 10 to 12. Parts of a length-measuring device of this further embodiment are illustrated on an enlarged scale in FIGS. 10 to 12 of the drawings and are described in further detail below. This length-measuring device replaces parts of the length-measuring device of the above-described first embodiment of a camera.

In this further embodiment, instead of the sprocket wheel 18 with the shaft 21 of the embodiment firstly described with the aid of FIGS. 1 to 9, a sprocket segment 48 is provided, which merely comprises two teeth $48_1$ and $48_2$ and is adjustable by means of a shaft 51 in a slot 53 in a housing partition 52 transversely to the film transportation path in a similar manner to the sprocket wheel 18 with the shaft 21 of the first embodiment according to FIGS. 1 to 9. However, in contrast to the teeth of the sprocket wheel 18, the two teeth $48_1$ and $48_2$ of this embodiment are arranged on the circumference 48' of the sprocket segment 48 at a distance apart which is greater than the distance $A_1$ between two successive perforation holes $i_1$ and $i_2$ of the film F of the manufacturing type illustrated in FIG. 12.

However, the circumferential distance between the two teeth $48_1$ and $48_2$ can also be equal to the distance $A_1$ if the second tooth has a larger cross section than a respective perforation hole in the film F and is therefore prevented from engaging in the respective perforation hole.

Also in this embodiment, the film transportation wheel 13 is unlocked during actuation of the release button 42 and during photographic recording, so that a film transportation cycle, i.e. film transportation by a frame gauge in each case, can begin. In this operating state, the advancing tooth $48_1$ of the sprocket segment 48 engages with the perforation hole $i_1$ of a perforation hole pair $i_1, i_2$ in the film F, which is guided along a slightly concave film transportation path, as shown in FIG. 10.

If a film transportation movement is then introduced by actuating the film transportation wheel 13, then the advancing tooth $48_1$ firstly remains in engagement with the perforation hole $i_1$ in the film F. The following tooth $48_2$ only reaches the transportation path of the film F once the perforation hole $i_1$ in the film has passed the location on the film path at which the second tooth $48_2$ comes to rest upon the upper surface of the film F. The second tooth $48_2$ therefore comes to rest upon the film F and is supported thereon, so that with the further transportation of the film F there is a pivoting of the sprocket segment 48 with its shaft 51 transversely to the film transportation path about the tip of the tooth $48_2$ as a pivot point and the shaft 51 is moved somewhat further away from the film path within the slot 53, as illustrated in FIG. 11. Once the second perforation hole $i_2$ in the film F has passed the first tooth $48_1$, an operating state is reached which is comparable with the operating state of the first embodiment according to FIG. 8. In this state, the sprocket segment 48 is arrested in its rotational movement, the film F sliding during its further transportation beneath the two teeth $48_1$ and $48_2$ resiliently resting upon the upper surface of the film.

In this embodiment, a film transportation switching member, not shown, is provided on the shaft 51, which member corresponds in respect of its function to the film transportation switching member constructed as the cam wheel 19 in the above-described first embodiment and with the adjustment of the shaft 51 transversely to the film transportation path, thereby effecting a movement away from the said path, firstly maintains a previously effected unlocking first embodiment transportation wheel 13 as in the first embodiment and effects a renewed locking when, at the end of film transportation through one frame gauge and with the interim transfer of the sprocket segment 48 into the position according to FIG. 12, the tooth $48_1$ of the sprocket segment drops into the following perforation hole (i+1), in the film F and the sprocket segment 48 with its shaft 51 is moved back transversely towards the film transportation path.

FIG. 12 illustrates the operating state in which the tooth $48_1$ of the sprocket segment 48 rests upon the film 12 and the film slides thereunder, the film having reached a position shortly before completion of the transportation movement through one frame gauge, so that the tooth $48_1$ of the sprocket segment 48 can engage in the perforation hole $(i+1)_1$, after a further short transportation of the film.

So that, after the transverse adjustment away from the film transportation path, the sprocket segment 48 moves from the position according to FIG. 11 into the position according to FIG. 12, in which tile tooth $48_1$ firstly rests resiliently upon the film F and with a corresponding further transportation of the film after completion of the transportation movement through a full frame gauge can engage in the following perforation hole $(i+1)_1$ in the film F, the sprocket segment 48 is transferred from the position according to FIG. 11 prior to completion of a film transportation movement through a frame step into the position according to FIG. 12. This is effected, for example, by rotating back the sprocket segment 48 in a clockwise direction through less than 90° about the axis determined by the shaft 51. The crossing of the sprocket segment 48 transversely to the film transportation path required to this end is made possible by the corresponding large dimensioning of the slot 53 in its longitudinal extension. Instead of a return rotation of the sprocket segment 48 in a clockwise direction through less than 90°, it is also possible to effect a forward rotation of the sprocket segment 48 in an anti-clockwise direction through more than 270° from the position according to FIG. 11 into the position according to FIG. 12. The described return rotation of the sprocket segment 48 through less than 90° or the forward rotation of the sprocket segment 48 through more than 270° can be effected via an intermediate gearing, not shown, optionally by means of a slip clutch, by the film transportation wheel 13 or a different part of the film transportation device.

During the above-described transfer of the sprocket segment 48 from the position according to FIG. 11 into the position according to FIG. 12, the shaft 51 of the sprocket segment can enter a lateral bay schematically illustrated in FIGS. 10 to 12 in the slot 53 extending with its longitudinal axis transversely to the film transportation path, and can thus remain in an upper position in which it is further removed from the film transportation path, i.e. at or in the vicinity of the upper edge of the slot 53 further removed from the film transportation path. Nevertheless, the shaft 51 can leave this lateral bay in the slot 53 again and can return to the lower edge of the slot 53 lying closer to the film transportation path when the tooth $48_1$ drops into the perforation hole $(i+1)_1$ so that the sprocket segment 48 with its tooth $48_1$ adopts a position which is comparable with the position according to FIG. 10 in the preceding transportation cycle.

If the lateral bay in the slot 53 illustrated in FIGS. 10 to 12 is not provided, or if a different structure is not provided, by means of which in the operating state according to FIG. 12 the shaft 51 remains on or in the vicinity of the upper edge of the slot 53 until the tooth $48_1$ drops into the following perforation hole in the moving film F, then the shaft 51 already moves back to the upper edge of the slot 53 in the operating state according to FIG. 12, i.e. before the engagement of the tooth $48_1$ in the perforation hole $(i+1)_1$, in the film F.

In the above-described second embodiment according to FIGS. 10 to 12, the sprocket segment 48 acts as an engagement member. In an initial film transportation phase, the tooth $48_1$ acts as a leading engagement element and the tooth $48_2$ as a following support element. As described above, the tooth $48_1$ rests upon the film F in a subsequent film transportation phase of a film transportation cycle.

As a modification of the embodiment described with reference to FIGS. 10 to 12, a sprocket disc having only one tooth $48_1$ can be provided as the sprocket segment 48 in a manner not illustrated, the radius of the sprocket disc in a central circumferential section of approximately 270° lying diametrally opposite the tooth $48_1$ corresponding to the distance between the pivot axis and the tip of the tooth $48_1$. Circumferential intermediate sections, which lie immediately in front of or behind the tooth $48_1$ in the direction of rotation, form indentations having a radius reduced by the tooth height, so that the tooth $48_1$ rises from these indentations. In this variation of the embodiment according to FIGS. 10 to 12, the second tooth $48_1$ is thus widened to form a broad segment having an angular extension in excess of 270°.

In this respect, the central circumferential section lying diametrally opposite the tooth $48_1$ of the sprocket disc acting as an engagement member forms a support element with its edge facing the tooth $48_1$, which support element is comparable in respect of its function to the tooth $48_2$ acting as a support element in the design according to FIGS. 10 to 12. When the sprocket disc is further rotated into a position which is comparable with the position of the sprocket segment according to FIG. 12, the central circumferential section of the disc is supported on the film F during a large part of this rotary movement.

Also in this variation, a switching member which is connected to the sprocket disc and is not shown in further detail ensures that the film transportation wheel 13 remains released so long as the shaft 51 is transversely adjusted away from the film transportation path, or so long as the tooth $48_1$ cannot yet engage from the position according to FIG. 12 in the perforation hole $(i+1)_1$, in the film.

As a modification of the above-described designs, it is also possible to provide the embodiment according to FIGS. 10 to 12 with two or more engagement elements and support elements in succession on the circumference of the sprocket segment or sprocket disc, the geometric reciprocal distances and constructions being correspondingly adapted.

In all the above-described embodiments, the respective support element is supported directly on the film when the engagement member is in a corresponding position. The film is supported on its rear side against the housing at the support site and/or has such a degree of intrinsic rigidity that it cannot escape the mechanical pressure exerted by the support element as a result of the restoring spring acting upon the engagement member. More particularly in the embodiment according to FIGS. 10 to 12 and also in the above-described modification thereof, the tooth $48_2$ or a corresponding circumferential section of a sprocket disc can also be supported as a support element against a surface (not shown) fixed to the housing and extending parallel to and outside the film path in cases where the tooth $48_2$ or a corresponding circumferential section of the sprocket disc is displaced axially as a support element on the shaft 51 in relation to the tooth $48_1$ acting as an engagement element and is arranged in an axial region of the shaft 51 outside the film transportation path.

A number of further modifications, which are not illustrated in the drawings, are described in the following.

The cam wheel 19 acting as a switching member and connected to the sprocket wheel 18 in the embodiment according to FIGS. 1 to 9 with its teeth $19_1$ to $19_3$ and a corresponding switching member connected to the sprocket segment 48 in the embodiment according to FIGS. 10 to 12 can act, instead of upon the intermediate lever 29, directly upon the pawl lever 38, with a corresponding adaptation of the reciprocal arrangement and dimensioning, in order to control its movement for engagement in the film transportation path 13 or to release the film transportation wheel. Instead of a switching member constructed as a cam wheel 19 or the like, the shaft 21 or 51 per se, which is adjustable transversely to the film path, can act as a switching member. To this end, the shaft 21 can, for example, comprise an axial extension 21' acting as a switching rod, which extends axially beyond the sprocket wheel 18 or beyond the indexing gear 20 and cooperates with a lever or other gearing element arranged in the path of movement of the switching rod. Instead of acting upon the film transportation wheel 13, the switching member can also act upon a different gearing element of the film transportation device.

If the film transportation in the camera is effected by means of an electric motor, the switching member can control an electrical switch arranged in the circuit of the drive motor when the engagement element is moved back into the film transportation path, the electrical switch interrupting the motor circuit when it is actuated and thus stopping the motor for film transportation. In this manner, the drive for the film transportation device is rendered inoperative, so that the said device is locked.

The solution according to the invention can also be used with a corresponding adaptation of the film transportation device and film length-measuring device in cases where the film F is transported, as it is withdrawn, from the film cassette K in the illustration according to FIG. 51 and FIGS. 5 to 9 step-by-step from right to left into the film storage chamber 12 in the camera housing 1 to form a loose film roll $F_w$ and is exposed frame-by-frame as it passes an exposure window in the camera. In this case, there is a subsequent return transportation of the film F from left to right, the rewinding into the film cassette K being effected in a single step, naturally without exposing the film again.

Provided as a film F is a colour negative film or reversible colour film which is known per se in its chemical and physical layer structure, optionally with an additional coating for the magnetic recording of additional data.

However, a magnetic image recording material as known from video technology can also be used as film F if the camera is equipped with suitable optoelectronic light receivers.

The above-described preferred embodiments of a photographic recording device according to the invention are all cameras. The solution according to the invention for frame-by-frame film transportation can also be used in a manner not illustrated in further detail in photographic reproducing devices, e.g. in picture-viewing devices and projection devices and also in simply constructed copier devices in which there is a frame-by-frame film advance for reproducing images which are preferably recorded on a film of the above manufacturing type.

If an electric motor drive is provided in photographic reproducing devices of this type for the frame-by-frame advance, then a manually actuated switch can be provided for supplying the film advance commands instead of the release button 42 in the camera described in the above embodiments.

I claim:

1. A photographic recording or reproducing device adapted to be loaded with film having along an edge thereof a film perforation which includes a plurality of perforation holes, and to feed loaded film stepwise frame to frame, said device comprising
   (a) film transportation means for transporting the film along a film transportation path;
   (b) film metering means for determining when the film upon transportation by said film transportation means reaches a respectively given frame position, said film metering means including a film engagement member mounted in said photographic recording or reproducing device so as to be rotatable about an axis in a predetermined rotational direction, and to be movable transversely to said film transportation path;
   (c) film transportation stop means controllable by said film metering means, for stopping transportation of the film by said film transporting means upon determination by said film metering means that the film has reached the respectively given frame position;
   (d) wherein said film engagement member of said metering means comprises
      (d1) an engagement element mounted at said engagement member and provided to enter into a perforation hole of the film and to remain in an entered position during transportation of the film by said film transportation means along said film transportation path by a partial length of a frame, and during simultaneous rotational movement of said film engagement means about said axis; and
      (d2) a support element also mounted at said engagement member in a trailing position relative to said engagement element with respect to said predetermined rotational direction, and provided for engaging a support surface extending parallel to said film transportation path, so as to support said engagement member for causing movement of said engagement member transversely away from said film transportation path while said engagement element still engages said perforation hole of the film during transportation of the film along said transportation path by said partial length of a frame and simultaneous rotational movement of said engagement member.

2. A device according to claim 1, wherein said engagement element of said film engaging member is arranged so as the come out of engaging the respective hole of the film when said film engaging member is moved transversely to and away from said film transportation path.

3. A device according to claim 1, wherein a return movement of said film engaging merger by being moved transversely back toward said film transportation path is effected with an engagement of an engagement element of said film engaging member in a perforation hole of the film.

4. A device according to claim 1, wherein said support element of said film engaging means, when engaging said support surface, rests upon the film so as to enable the film to slide during transportation by said film transportation means beneath said support element.

5. A device according to claim 1, wherein said film engaging member comprises a plurality of engagement elements and a plurality of support elements arranged in succession at said film engaging member.

6. A device according to claim 1, wherein said engagement element and said support element of said film engaging member are of like structure.

7. A device according to claim 1, wherein said engagement element and said support element of said film engaging member are provided for alternately operating as support element and engagement element, respectively.

8. A device according to claim 1, wherein said film transportation stop means comprise a shaft of said film engaging member which together with said film engaging member is capable to be shifted transversely to said film transportation path.

9. A device according to claim 1, wherein said film transportation stop means is provided to be operated by a level gearing of said film metering means.

10. A device according to claim 1, wherein a sprocket wheel, a cam wheel and/or an indexing wheel of a frame counting means are integrally formed with a shaft.

11. A device according to claim 1, wherein said film transportation stop means is provided for cooperating with driving means of a photographic shutter.

12. A device according to claim 1, forming a camera.

13. A device according to claim 1, wherein a support element of said film engaging member is arranged thereon or is shaped in such a manner that it is unable to engage in perforation holes of the film.

14. A device according to claim 13, provided for being loaded with a film in which successive perforation holes of the film perforation are mutually spaced alternately by comparatively small distances and comparatively large distances, wherein a mutual distance between an engagement is larger than said comparatively small distance between two successive perforation holes of said film.

15. A device according claim 1, wherein said film engaging member is formed by a sprocket wheel having a plurality of sprocket teeth which are arranged at equal mutual circumferential distances and respectively form engagement elements and support elements.

16. A device according to claim 15, provided for being loaded with a film in which successive perforation holes of the film performation are mutually spaced alternately by comparatively small distances and comparatively large distances, wherein the mutual circumferential distance between two adjacent sprocket teeth of the sprocket wheel corresponds to said comparatively small distance between two successive perforation holes of said film.

17. A device according to claim 15, wherein the number of sprocket teeth provided at said sprocket wheel is at least 4.

18. A device according to claim 15, wherein said sprocket wheel is provided to control a frame counting means.

19. A device according to claim 1, wherein said film transportation stop means comprise a shaft of said film engaging member which together with said film engaging member is capable to be moved transversely to said film transportation path.

20. A device according to claim 19, wherein said film transportation stop means comprise a cam wheel of said shaft of said film engaging member.

21. A device according to claim 20, wherein said cam wheel is arranged coaxially to a sprocket wheel forming said film engaging member, and comprises half as many teeth as said sprocket wheel.

* * * * *